United States Patent
Cook et al.

[11] 3,790,276
[45] Feb. 5, 1974

[54] DIRECT MEASUREMENT OF SHIP BODY DISTORTION USING A LASER BEAM

[75] Inventors: George W. Cook, McLean, Va.;
David T. Milne, Silver Spring, Md.

[73] Assignee: The United States of America as represented by the Secretary of the Navy, Washington, D.C.

[22] Filed: Apr. 7, 1971

[21] Appl. No.: 131,969

[52] U.S. Cl. .............................. 356/152, 250/203 R
[51] Int. Cl. ........................................... G01b 11/26
[58] Field of Search . 356/152; 250/203 R; 244/3.16

[56] References Cited
UNITED STATES PATENTS

| | | | |
|---|---|---|---|
| 2,952,779 | 9/1960 | Talley | 356/152 |
| 3,494,576 | 2/1970 | Lamelot | 244/3.16 |
| 2,994,780 | 8/1961 | Wilcox, Jr. | 250/203 R |

FOREIGN PATENTS OR APPLICATIONS

| | | | |
|---|---|---|---|
| 1,259,952 | 3/1961 | France | 250/203 R |

Primary Examiner—Maynard R. Wilbur
Assistant Examiner—Buczinski, S. C.
Attorney, Agent, or Firm—R. S. Sciascia; Q. E. Hodges

[57] ABSTRACT

A laser light beam is directed to a cruciform target containing a series array of photo detectors on each arm. The light beam is perpendicular to the cruciform and is orbited about the cruciform center. A differential pulse width modulated (DPWM) wave is generated by the signals emitted from the photo detectors each time they are illuminated by the light beam, as the output of the photo detectors are connected to bistable flip-flops which are triggered into positive and negative states and whose pulse width depends upon the time for the rotating laser beam to travel between two arms displaced from each other by a 180° of arc. Angular distortions in the X axis and the Y axis are separately measured by two pairs of arms, the arms of each pair being displaced 180° from each other. The width of the pulse is proportional to the angular distortion.

4 Claims, 9 Drawing Figures

INVENTOR
GEORGE W. COOK
DAVID T. MILNE

BY Joel Rosenblatt
AGENT

ATTORNEY

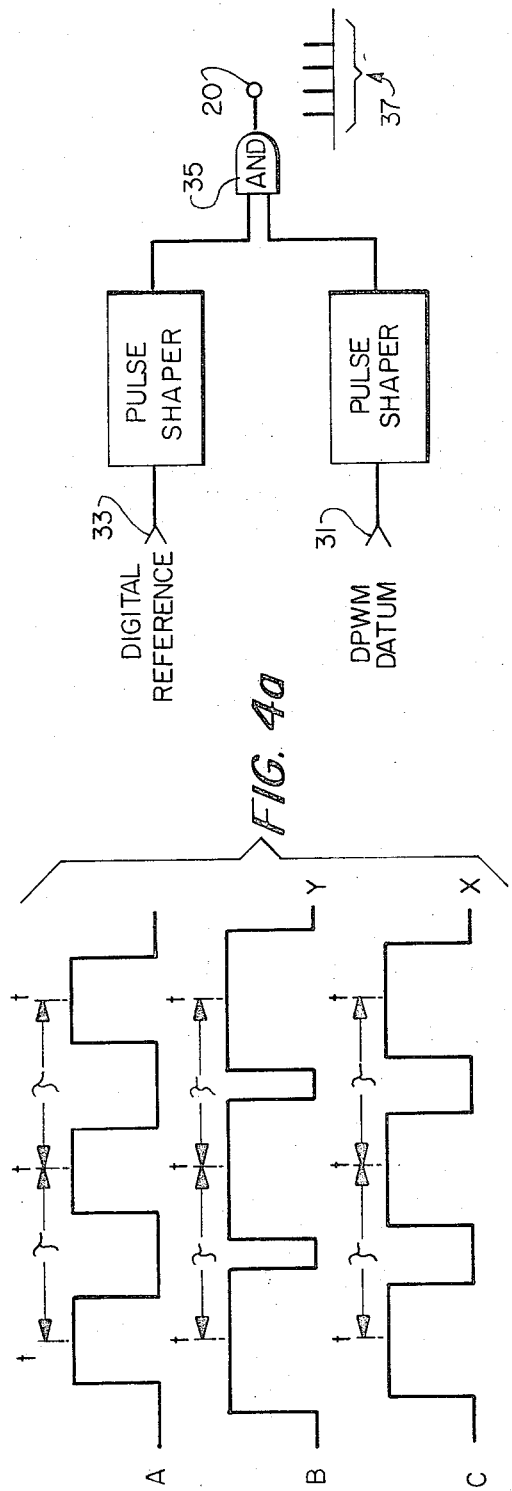
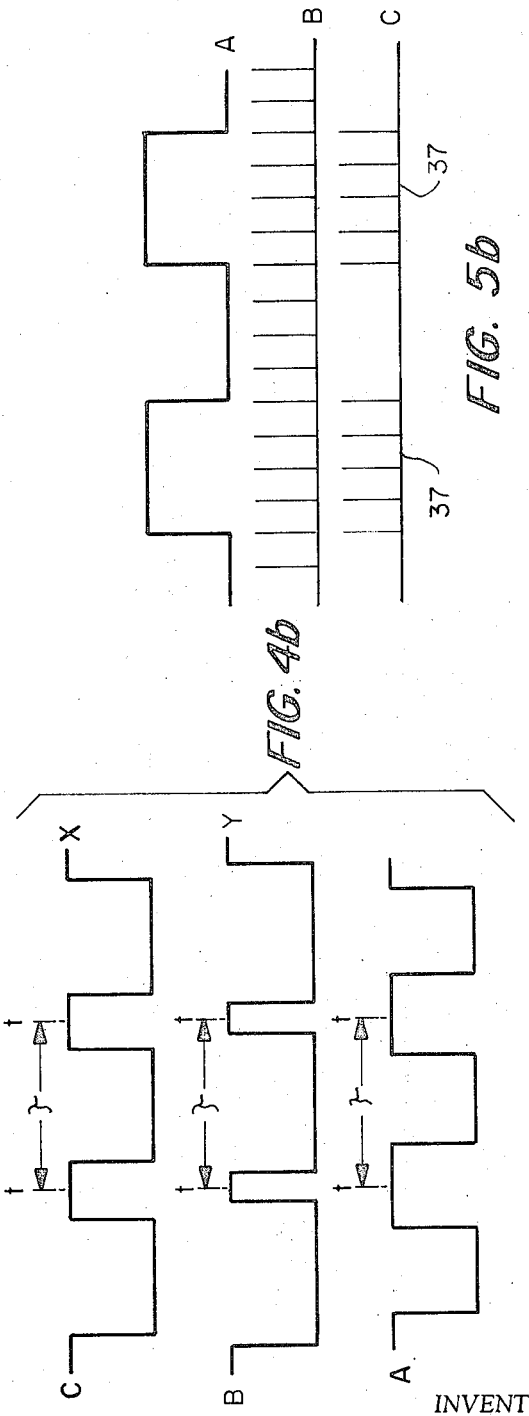

DIRECT MEASUREMENT OF SHIP BODY DISTORTION USING A LASER BEAM

The invention described herein may be manufactured and used by or for the Government of the United States of America for Governmental purposes without the payment of any royalties thereon or therefor.

BACKGROUND OF THE INVENTION

The prior art contains many devices used for detecting angular variation about a reference axis and utilizing laser beams. However, these prior art devices use a technique requiring the laser beam be centered at a particular point and deviations from that point are detected. These devices also use photo detectors which measure the quantity and quality of the light beam. The resolution of these prior art devices and their accuracy depend upon the resolution of the laser beam and the quality of light that can be transmitted over a finite distance. In addition, these systems require complicated and complex signal processing circuitry for tracking the beams illumination point and determining its displacement from the axial reference.

SUMMARY OF THE INVENTION

A laser is mounted at one end of a structure, the stern of a ship for example. A target to be illuminated by the laser beam is mounted at another point in the structure spaced from the laser so that a reference axis is defined between the laser and the target by the laser beam. Angular distortions of the body are then measured relative to the reference axis.

The target according to a first embodiment is a cruciform shape and has a series of photo detectors arrayed on each arm. The plane of the cruciform is perpendicular to the direction of the laser light path. The laser beam is orbitly rotated about the center of the cruciform target with the result that it illuminates a photo detector in each arm as its orbit path crosses that arm. The array of photo detectors in each of the four arms are connected in parallel so that any one photo detector triggered by the light beam energizes a bus line connected to the illuminated arm.

Each pair of arms displaced 180° from each other and arranged in a line are connected to a bi-stable flip-flop. As the rotating laser beam illuminates a first arm of the pair, the flip-flop is triggered into a positive state. When the laser beam traverses 180° of arc and illuminates the second arm of the pair, a second signal is received by the bi-stable flip-flop and its state changes. The pulse width of the positive state (i.e., the time for the rotating laser to traverse 180° of arc changing the flip-flop from its positive to negative state) corresponds to the axial displacement of the target from the light path. This result is apparent when one examines the effect of axial distortions on the position of the cruciform center relative to the orbiting beam of light.

When no distortion is present, the path described by the beam of light is a circle, illuminating photo detectors on each of the four arms, the detectors located at equal distances from the center, and with the circular path described having as its center, the center of the cruciform. Now, assuming that the structure undergoes a distortion about the reference axis described by the light path, and the distortion being in a vertical direction, the orbital light path center is then displaced from the center of the cruciform and relocated on one of the vertical arms. The time for the light beam to travel from a first horizontal arm to a second arm 180° from the first arm will now be different than the time it took the light beam to travel from a first horizontal arm to the second arm displaced 180° from the first arm, when no distortion was present and the circular light path was centered on the cruciform center.

A second embodiment of this invention has substituted for the cruciform target a rotating mirror with series arrays or banks of photo detectors arranged parallel to the light path and at the 12 o'clock, 3 o'clock, 6 o'clock and 9 o'clock positions. The rotating mirror has a 45° angle reflective surface and when no distortions are present the structure, the light path is reflected 90° from the center of the prism and in a circular orbited path. The time interval for the orbited light beam to traverse two banks 180° from each other is then the same.

When distortion is introduced in the body, the light beam is displaced from the center of the rotating mirror but is still deflected toward the array of photo detectors. However, the effect as described above, with reference to the cruciform target, is repeated in this second embodiment. The time interval between illumination of each of the banks in a pair arrayed 180° from each other is changed and this change is reflected in the pulse widths of the positive and negative output states of each bi-stable flip-flop.

The pulse data is processed to produce a read out of the magnitude and rate of the angular variations over a period of time.

Accordingly, it is a first object of this invention to measure the angular distortion of a body about a reference axis.

It is a second object of the instant invention to use a rotating laser beam to measure the time changes in target illumination and to generate signals corresponding to these time changes.

It is a third object of this invention to use a rotating mirror, illuminated by the laser beam to generate signals corresponding to the angular displacement of the laser beam from the center of the rotating mirror.

It is a fourth object of this invention to produce independent signal outputs corresponding to body distortions in the X and Y directions.

These and other objects of the invention will become apparent as the following description is read.

BRIEF DESCRIPTION OF THE DRAWINGS

FIG. 2b shows the target of FIG. 2a, with the orbital laser light path and with no distortion superposed with the laser light path when distortion is present and where the distortion is in the opposite direction of the distortion as shown in FIG. 2a.

FIG. 4a, line A, shows the pulse wave train produced by the target of 2a, when no distortion is present. FIG. 4a, lines B and C, show the pulse wave trains produced when distortion is present in a first direction (shown in FIG. 2a) relative to the reference axis.

FIG. 4b, line A, shows the pulse wave trains produced in the target of FIG. 2b, when no distortion is present. FIG. 4b, lines B and C show the pulse wave trains produced when distortion is present in a second direction (shown in FIG. 2b) relative to the reference axis.

FIG. 5 shows a system for processing the pulses of FIGS. 4a and 4b.

DESCRIPTION OF THE PREFERRED EMBODIMENT

Figure 1:
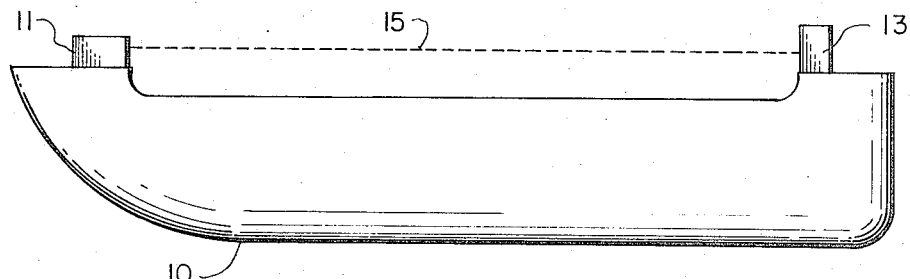
FIG. 1 is a side view of a ship in which the laser beam distortion detector is mounted at the fore and aft ends and this view is solely provided to orient the reader with regard to the system.
Figure 2A:
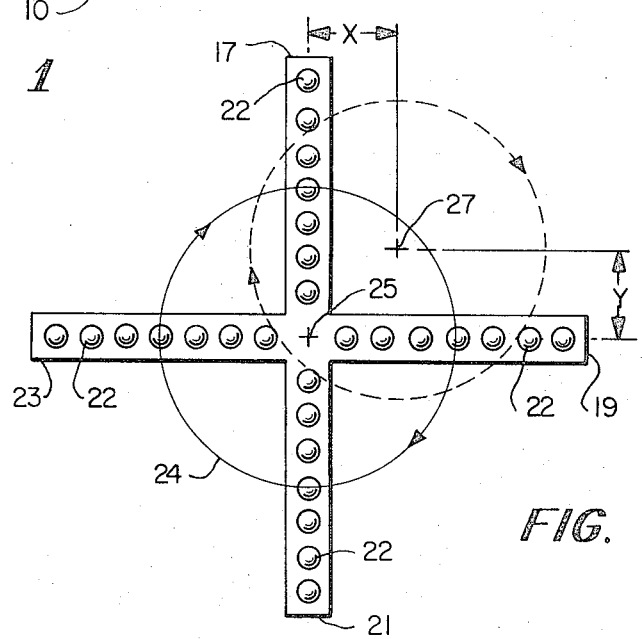
FIG. 2a shows the target of the first embodiment of this invention with the orbital light path from the laser, with no distortion, superposed with the light path from the laser when distortion is present.
Figure 3A:
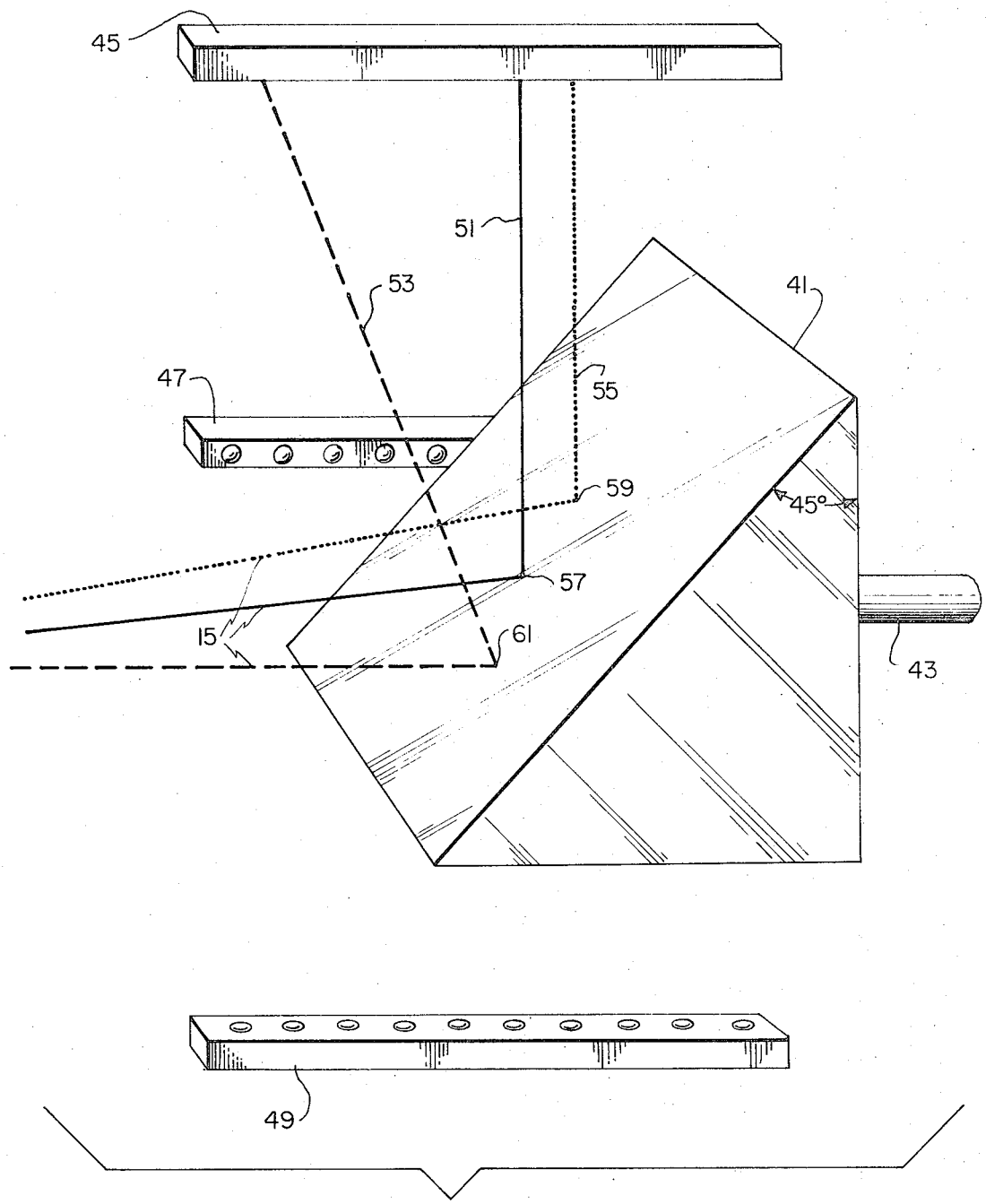
FIG. 3a shows the target of the second embodiment of this invention, as including a rotating 45° prism to deflect the incoming light beam to photo detector banks arrayed at the 12 o'clock, 3 o'clock, 6 o'clock and 9 o'clock positions, relative to the axis of rotation of the prism.

Referring now to FIG. 1, a ship 10 is shown with a laser light source 11 at one end and a target 13, as shown in FIGS. 2a or 3a. The beam of light 15, defines a reference axis and is aligned with the target center when the ship body is at rest. Any structural deformation about the axis defined by light path 15, will result in the light from laser 11 shifting relative to the target and illuminating a different portion of the target.

Figure 2B:
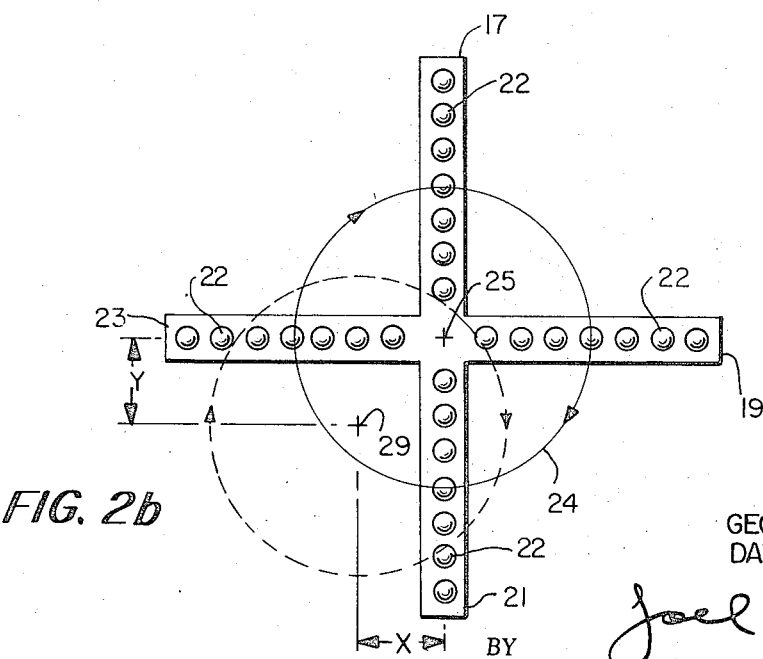

Referring now to FIGS. 2a and 2b, the effect of the distortion on the target illumination by the light is seen. The target as shown in FIGS. 2a and 2b is a cruciform having an arm 17 at the 12 o'clock position, an arm 19 at the 3 o'clock position, an arm 21 at the 6 o'clock position, and an arm 23 at the 9 o'clock position. It is to be understood however, that the specific shape of the target may be different from the cruciform shown and may take other shapes in accordance with the principles of this invention. The plane of the cruciform is perpendicular to the path of light 15, shown in FIG. 1. Arms 23 and 19, displaced 180° are a first pair of detecting angular distortions in the Y direction. Arms 17 and 21, arranged 180° from each other are a second pair used to detect angular distortions in the X direction. On each of the arms are a series of photo detectors, the numeral 22 indicating a typical detector on each arm. In this embodiment 7 are shown, it being realized of course, that the size of the target and the number of photo detectors can be varied as circumstances dictate.

When the body is at rest, the laser orbital light path rotates clockwise about the center 25, of the target describing circular orbital path 24. The orbital path is of a constant frequency. When no distortion is present in the ship, the time interval between the illumination of arm 23 and arm 19 is equal to the time interval between the illumination of arm 19 and arm 23. And when the orbital light is centered on the cruciform center 25, the time interval between illumination of arm 17 and arm 21 is equal to the interval between the successive illumination of arm 21 and arm 17.

The laser beam 15, by illuminating arm 17, for example, causes a signal to be generated at one of the photo detectors (indicated by numeral 22) arranged on the arm. Photo detectors on each one of the arms 17, 19, 21 and 23, are connected in parallel to a bus so that the light beam illuminating any photo detector on arm 17 for example, would generate a signal on the bus connected to arm 17. Arms 17 and 21 are designated a pair as are arms 23 and 19. The bus from the parallel connected photo detectors of arm 17 are wired to a bistable flip-flop along with the bus from the parallel connected photo detector from arm 21. The flip-flop responsive to the illumination of the arm and the photo detectors therein, changes state and holds this state until it receives a second signal when the light beam illuminates arm 21 and one of the photo detectors thereon. As the orbiting light path continues around from arm 21, back to arm 17, the second state of the flip-flop is held until another signal is delivered to it by a photo detector on arm 17.

Similarly, the bank of photo detectors on arm 23 are wired in parallel and connected to a bi-stable flip-flop together with the bus from the parallel connected photo detectors on arm 19. The orbiting light path illuminating arm 23, produces a signal in a photo detector thereon and changes the state of the flip-flop. This state is held until the orbiting light path illuminates arm 19, producing a signal in one of the photo detectors thereon and delivering a second signal to the flip-flop, changing its state. This second state is held until the orbiting light path once again illuminates arm 23, and one of the photo detectors thereon once again changes its state. The changing states of the flip-flops are shown in the time diagrams of FIGS. 4a and 4b.

When no distortion relative to the reference axis defined by light beam 15 is present in the body, the time duration for the orbiting beam to travel between each arm of a pair of arms arranged 180° apart will be the same. (As can be seen by inspection of light path 24 in FIG. 2a.) The flip-flop will then produce an unmodulated pulse train with equal and positive and negative states as shown in line A of FIGS. 4a and 4b.

The effect of distortion is to displace the orbiting beam pattern from the target center producing a differential pulse width modulated wave (DPWM). The DPWM wave pulse period and the time center $t$ or center of energy is undisturbed by pulse width modulation as the pulse is expanded or contracted about its center point of energy $t$.

When the body is distorted so the center of the orbital light path 24 is shifted with respect to the center 25, of the cruciform to point 27 (FIG. 2a), the time for the laser beam to travel between arm 23 and arm 19, will be longer than for the laser beam to travel from arm 19 back to arm 23. It is seen therefore, that if a bistable flip-flop is programmed to be triggered to a positive state when a photo detector on arm 19 is illuminated, then for each period of the laser beam orbit, the wave train generated will be the DPWM train as shown in FIG. 4a, line B. This DPWM wave train corresponds to distortion in the Y direction and will have a wider positive pulse and a narrower negative pulse width, proportional to the displacement of the center 27, of the orbiting light path in the Y direction from the cruciform center 25.

Similarly, when the distortion in the body causes the laser beam orbit 24 to shift to center 27, (FIG. 2a), the time interval for the light path to travel from arm 17 to arm 21 will be longer than the time for the light path to travel from arm 21 back to arm 17, If a bi-stable flipflop is programmed to be triggered positive when the beam of light triggers arm 21, the resultant wave train from this flip-flop will have a wider positive pulse width and a narrower negative pulse width as shown in line C of FIG. 4a, compared to the pulse train shown in line A. The pulse width shown in line C of FIG. 4a, is proportional to the displacement of the orbital light path in the X direction from cruciform center 25, and is proportional to the angular distortion of the structure relative to light path 15.

Referring now to FIG. 2b, the target of FIG. 2a is shown with the light path center 29, displaced in an opposite direction from the light path center 27, shown in FIG. 2a. As can readily be seen by an examination of the displaced light path upon the cruciform and the DPWM wave shown in line B of FIG. 4b, the negative pulse width corresponding to the displacement of center 29, from center 25 in the Y direction will be wider than the negative pulse width shown in line A of FIG. 4b. The DPWM wave produced by an orbiting light path centered at 29, and shown in line C of FIG. 4b, will have wider negative pulse width of the wave train shown in line A and with its width corresponding to the displacement of the illumination pattern centered at 29, relative to the cruciform center 25 and in the X direction.

Referring now to FIG. 5a, a system is shown for extracting the information in the pulse wave train shown in FIGS. 4a and 4b. The output of a flip-flop shown is inputted to a pulse shaper at DPWM data input 31. This input signal is shown in line A of FIG. 5b and represents the output of a flip-flop. At the same time a digital reference signal consisting of periodic impulses of a substantially higher frequency than that DPWM wave is inputted to digital reference input 33. The output of each of the pulse shapers is fed into an "and" gate 35, which produces an impulse output corresponding to the coincidence of the digital reference with the positive excursions of the DPWM datum wave. As shown in line C of FIG. 5b, the pulses gated by "and" gate 35, and by the differential pulse width modulated wave can then be fitted to an electronic counter which can interpret the number of pulses received.

When this data processing technique is used, the digital reference impulses can be generated by the same device used to produce the orbital light path and can provide a time reference wherein a constant number of impulses are generated for each period of the DPWM wave, corresponding to an orbit period.

The differential pulse width modulated wave may also be processed through a five pole Butterworth low pass filter to produce an analogue signal. The filter should have a half power frequency set to approximately 0.2 of the carrier frequency. A 50 db attenuation at the carrier frequency is then attained which results in a 1 percent amplitude fidelity from zero frequency to 0.1 times the carrier frequency. The reproduced analyzed data may be used to drive a "comb array" of bandpath filters for sophisticated spectral analysis or any type of analogue data analysis desired.

Figure 3B:
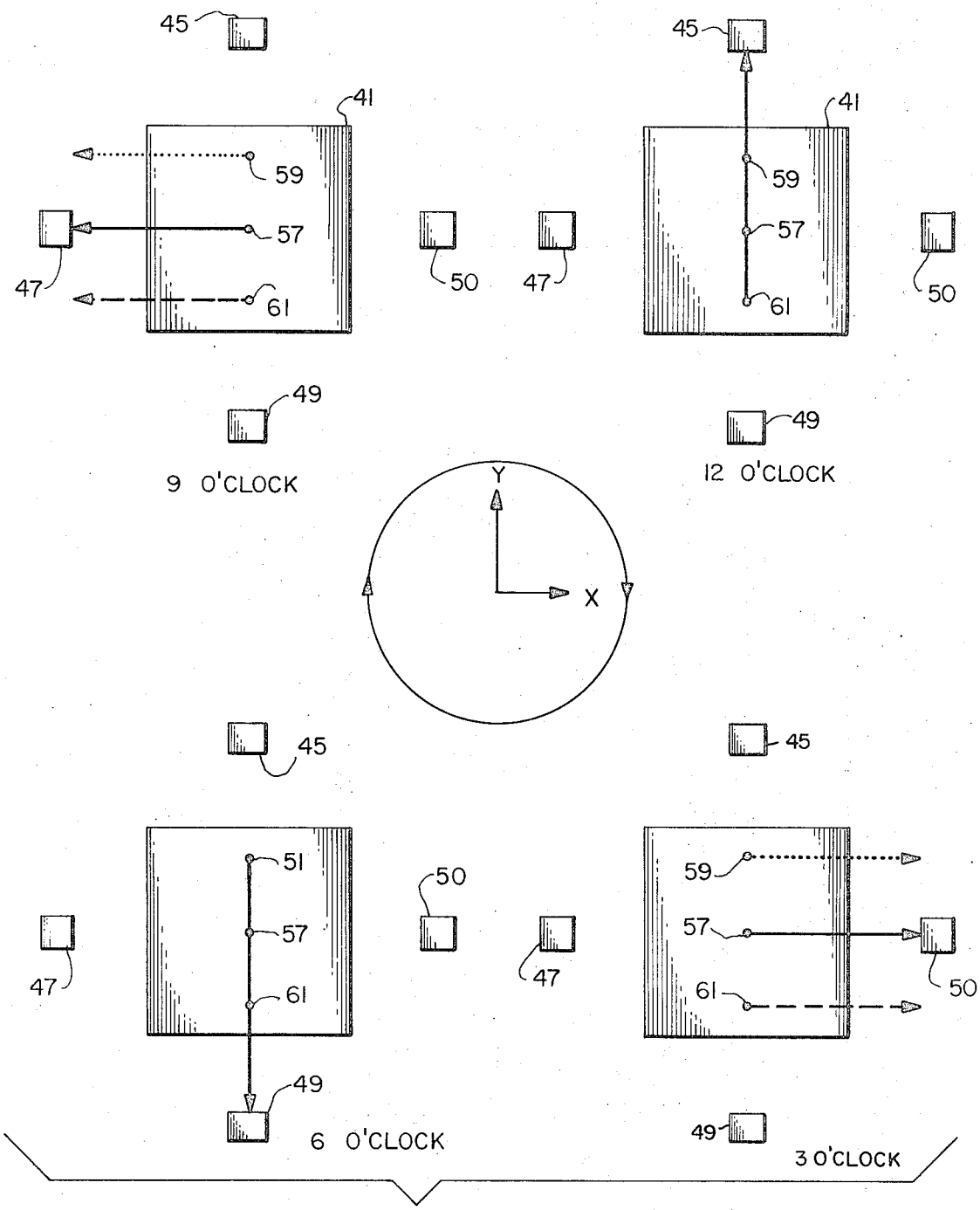
FIG. 3b shows individual views of the prism of FIG. 3a, at the 12, 3, 6 and 9 o'clock positions and the resultant light paths when no distortion is present in the body and when distortion is present in the vertical Y direction.

Referring now to FIGS. 3a and 3b, a second embodiment according to the principles of this invention is shown. The stationary cruciform target shown in FIGS. 2a and 2b, is replaced with a rotating prism 41, having a 45° face angle. The prism is attached to shaft 43 and driven by a motive means about the axis of the shaft. Arrayed around the rotating prism at the 12, 3, 6 and 9 o'clock positions are banks of photo detectors in series array parallel to the laser light beam 15. Each bank is wired to a bi-stable flip-flop as are the arms of the target shown in FIG. 2a.

As shown in FIG. 3a, photo detector bank 45 is at the 12 o'clock position, photo detector bank 47 is at the 9 o'clock position and photo detector bank 49 is at a 6 o'clock position, the photo detector 50 at the 3 o'clock position is not shown in this view but it is to be understood that a fourth photo detector 50, at the 3 o'clock position would be necessary in this embodiment.

The laser light beam is directed at point 57, on the face of the prism 41, and is deflected into a circular orbit by means of rotating mirror 41, rotating about shaft 43. As the mirror rotates in a clockwise direction, the orbiting light path sequentially illuminates each of the photo detector arrays or banks.

When distortion is introduced into the body, the mirror 41 is displaced relative to the light beam so the light beam impinges upon a different point on the face of the prism 41.

The operation of the rotating target embodiment is explained by way of example, and by means of FIG. 3b, in conjunction with FIG. 3a. When the prism 41 is shifted by distortion in the body about the beam 15, the light beam 15 is shifted away from point 57, on the face of prism 41 to point 59. The light paths from the prism to banks 47 and 50, are as shown in the upper left hand and lower right hand positions of the mirror 41 shown in FIG. 3b. When the prism 41 is rotated to the 9 o'clock position (FIG. 3b) the beam of light from point 59 has already passed by bank 47, setting the state of the flip-flop. When the mirror rotates to the 3 o'clock position, as shown in the lower right hand corner of FIG. 3b, the beam of light from point 59 has not yet illuminated the photo detector in bank 50. It can be seen, therefore, that displacements of a body in the Y direction causing the light beam to shift from point 57 to point 59, differentially modulates the pulse shown in line A of FIG. 4a, producing the pulse train of FIG. 4a line B. The wider positive output pulse is produced when the mirror is rotated between the 9 o'clock and 3 o'clock position and the narrower negative output pulse is produced when the mirror is rotated between the 3 o'clock position and the 9 o'clock position. The result of this distortion, explained above, will result in a wave train as shown in line B of FIG. 4a, assuming that the flip-flop is programmed to be triggered into its positive state when a photo detector at array 47 is illuminated.

On the other hand, if the body underwent distortion in the vertical direction but in the opposite direction, the light beam would shift from point 57 to point 61. When the mirror 41 is at the 9 o'clock position, the light beam has not yet reached the photo detector in array 47. when the mirror has rotated 180° to the 3 o'clock position the light beam has already passed through and illuminated a photo detector in bank 50 and triggered the flip-flop to the other state. It can be seen, therefore, that when distortion on a body causes the light beam to shift from point 57 to 61, the pulse train of line A, FIG. 4b, is differentially modulated generating a DPWM wave as shown in line B of FIG. 4b.

The width of the DPWM wave of lines B, FIGS. 4a and 4b, would be proportional to the distortion of the body in the Y direction, about the reference axis. Similarly, the DPWM wave of line C of FIGS. 4a and 4b, would be proportional to the distortion of the body in the X direction about the reference axis and would be produced by the sequential signals produced in banks 45 and 49.

The embodiment shown in FIG. 3, is only described as to its operation with regard to distortion in the Y direction, it is to be understood that any distortions in the X direction will produce the same results rotated 90°.

The data processing system shown in FIGS. 5a and 5b, or the low pass filter system can be used to process the information produced by the embodiment shown in FIGS. 3a and 3b, the output wave train being the same for the fixed target wave trains.

When the fixed target rotating beam system is utilized any suitable method for beam spinning may be used. One suitable method utilizes two 45° angle prisms mounted on a circular plate with a first mirror mounted at the center of the plate to intercept the light beam and deflect it 90° to a second 45° mirror mounted at the periphery of the plate. The second degree mirror then deflects the light beam outwardly to the target and the plate is rotated so that the light beam from the second mirror describes an orbital path about an axis described by the beam emitted from the laser.

The mirrors on the beam spinner are adjusted so the radius of the projected circle is twice the maximum expected X and Y displacement to be measured. The reason is that the output of the system is proportional to $R \sin \theta$. For the system to be susbstantially linear $\theta$ must be limited to 30° and the $\sin \theta$ must then be less or equal to one-half.

Obviously many modifications and variations of the present invention are possible in the light of the above teachings. It is therefore to be understood that within the scope of the appended claims the invention may be practiced otherwise than as specifically described.

What is claimed is:

1. A system for measuring distortion of a body comprising:
    a source of radiant energy mounted on the body for establishing a measuring reference beam of coherent light;
    a target for receiving and detecting said radiation fixedly mounted on the body in linear spaced relationship to said source including a plurality of photo detector banks each equally radially spaced around the reference axis of said beam and aligned therewith, thus defining a target center;
    a differential pulse width modulated wave generator electrically connected to said photo detector banks of said target producing pulses of equal width when said body is undistorted and therefore said source and said target are aligned on the reference axis, and producing pulses of unequal width when said body is distorted, the relative width of said pulses being indicative of the degree of distortion; and
    a reflective surface mounted at a 45° angle on a shaft rotatable coaxial with the reference axis of said beam and being at the target center to deflect and orbit said beam radially onto said photo detector banks surrounding the target center.

2. The system of claim 1 wherein:
    said banks include at least four, each positioned at the 12 o'clock, 3 o'clock, and 9 o'clock positions relative to the reference axis of said beam;
    each of said banks spaced 180° apart, being designated a pair;
    a bistable flip-flop electrically connected to each pair and changing state in response to a signal from each of said banks of said pair;
    whereby the output of said flip-flop is a pulse wave of equal pulse widths when said target is aligned with said reference axis.

3. The system of claim 2, wherein:
    the time interval for said orbiting light beam to illuminate successive semi-circular arcs of 180° are unequal when said body is distorted relative to said reference axis, said flip-flop responsive to the said signal producing a differential pulse width modulated wave indicative degree said distortion.

4. A method of measuring distortion of a body comprising the steps of:
    projecting a beam of coherent radiant energy to illuminate and to define a reference axis to a target;
    arranging detectors, responsive to said radiant energy, spaced about the center of said target;
    driving the radiant energy in an orbital path about the center of said target when no distortion is present;
    distorting said projected beam from said orbital path about the center of said target in response to distortion of the body;
    producing a differential pulse width modulated signal proportionally responsive to the degree of distortion from said target detectors;
    detecting the differential pulse width modulated signals; and
    comparing the pulse widths of the differential pulse width modulated wave when distortion is present to the pulse width when no distortion is present, to measure the degree of distortion.

* * * * *